United States Patent
Bracha (10) Patent No.: US 6,687,759 B1
(45) Date of Patent: Feb. 3, 2004

(54) METHOD AND APPARATUS FOR PERFORMING METHOD LOOKUP IN THE PRESENCE OF MODULARITY CONSTRUCTS TO SUPPORT TRANSITIVE METHOD OVERRIDE

(75) Inventor: Gilad Bracha, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/374,463

(22) Filed: Aug. 13, 1999

(51) Int. Cl.$^7$ ................................................. G06F 9/00
(52) U.S. Cl. ....................................... 709/310; 717/154
(58) Field of Search ........................... 709/310; 717/154

(56) References Cited

U.S. PATENT DOCUMENTS

| | | | |
|---|---|---|---|
| 5,327,562 A | | 7/1994 | Adcock |
| 5,404,525 A | | 4/1995 | Endicott et al. |
| 5,632,034 A | * | 5/1997 | O'Farrell ..................... 717/140 |
| 5,721,824 A | | 2/1998 | Taylor ................... 395/200.33 |
| 5,913,064 A | | 6/1999 | Chen .......................... 395/702 |
| 5,918,052 A | | 6/1999 | Kruskal et al. |
| 6,102,966 A | * | 8/2000 | Tyma ........................ 717/110 |
| 6,526,571 B1 | * | 2/2003 | Aizikowitz et al. ......... 717/154 |

OTHER PUBLICATIONS

The Java Specification(first edition), James Gosling, 1996, Addison–Wesley, Chapter 15.*

Cardelli et al., "Modula–3 Report (revised)," digital Systems Research Center, Nov. 1, 1989.

* cited by examiner

Primary Examiner—John Follansbee
Assistant Examiner—LeChi Truong
(74) Attorney, Agent, or Firm—Hickman Palermo Truong & Becker LLP; Christian A. Nicholes; Bobby K. Truong (57) ABSTRACT

A method lookup mechanism is disclosed which not only enforces accessibility constraints imposed by modularity constructs but also enables transitive method override. According to one embodiment, when a method m is invoked on a target object, the method m in a resolved class is checked to determine whether it has been declared as public/protected. If so, then standard method lookup may be used to determine the proper implementation of method m to invoke. However, if the resolved method is not declared as public/protected, then the class of the target object is searched for an implementation of the method m. If no implementation is found, then a superclass of the target object class is searched for an implementation. This process repeats until an implementation is found or until the resolved class is reached. If an implementation for method m is found in a class (referred to as the current class) other than the resolved class, then a determination is made as to whether the current class can access the method m in the resolved class. The current class can access method m of the resolved class if the current class is in the same package P as the resolved class, or if an intervening class has "publicized" the method m of the resolved class. If either one of these conditions is met, then the implementation for method m in the current class is invoked. In effect, the method m of the current class is allowed to override the method m of the resolved class. Performing method lookup in this manner makes it possible to both enforce accessibility constraints imposed by modularity constructs and enable transitive method override.

30 Claims, 7 Drawing Sheets

PACKAGE P1

PUBLIC CLASS A

M1 (PACKAGE PRIVATE)
        •
        •
        •

PACKAGE P2

PUBLIC CLASS B EXTENDS A

M1 (PUBLIC/PROTECTED)
        •
        •
        •

*Fig. 1*

PACKAGE P1

PUBLIC CLASS A

M1 (PACKAGE PRIVATE)

PUBLIC CLASS B EXTENDS A

M1 (PUBLIC/PROTECTED)
        •
        •
        •

PACKAGE P2

PUBLIC CLASS C EXTENDS B

M1 (PUBLIC/PROTECTED)
        •
        •
        •

METHOD AND APPARATUS FOR PERFORMING METHOD LOOKUP IN THE PRESENCE OF MODULARITY CONSTRUCTS TO SUPPORT TRANSITIVE METHOD OVERRIDE

BACKGROUND

This invention relates generally to computer systems and more particularly to a method and apparatus for performing method lookup to support transitive method override in the presence of modularity constructs, such as packages.

Inheritance is a major property of most object oriented programming systems. With inheritance, when a class is declared as a subclass of a superclass, that subclass automatically inherits all of the methods and attributes of the superclass. Thus, if class A has method M1 and attribute AT1, then class B, which is a subclass of class A, automatically inherits method M1 and attribute AT1. In addition to inheriting the methods and attributes of the superclass, the subclass may further comprise additional methods and attributes. Thus, for the example given above, class B may further comprise methods M2 and M3, and attributes AT2 and AT3.

In addition to inheriting and adding methods and attributes, some object oriented systems further allow subclasses to override the methods of the superclass. That is, the subclass is allowed to provide an implementation for an inherited method which is different from that provided by the superclass. This means that, for the example given above, subclass B may provide a different implementation for method M1 than that provided by superclass A. For example, the implementation for M1 provided by superclass A may draw a square whereas the implementation for method M1 provided by subclass B draws a circle. Thus, even though both methods have the same name, they may have different implementations. Which implementation is invoked depends upon the class of the object instance on which the method is invoked. If the method is invoked on a class A instance, then the implementation provided by class A will be invoked. If the method is invoked on a class B instance, then the implementation provided by class B will be invoked. Because there may be multiple implementations for any particular method, a determination will have to be made at runtime as to which implementation to invoke. The process of selecting which implementation to invoke at runtime is referred to as dynamic method dispatch.

In single inheritance systems where every subclass is able to access, and hence, override every method of a higher level class, the dynamic method dispatch process is relatively straightforward. However, some systems, such as the Java™ programming system manufactured by Sun Microsystems, Inc. of Mountain View, Calif., implement constructs known as "modularity constructs" which make it possible for a developer to restrict the accessibility of certain methods of certain classes to other classes. In the face of these accessibility restrictions, dynamic method dispatch is made much more complicated.

Figure 1:
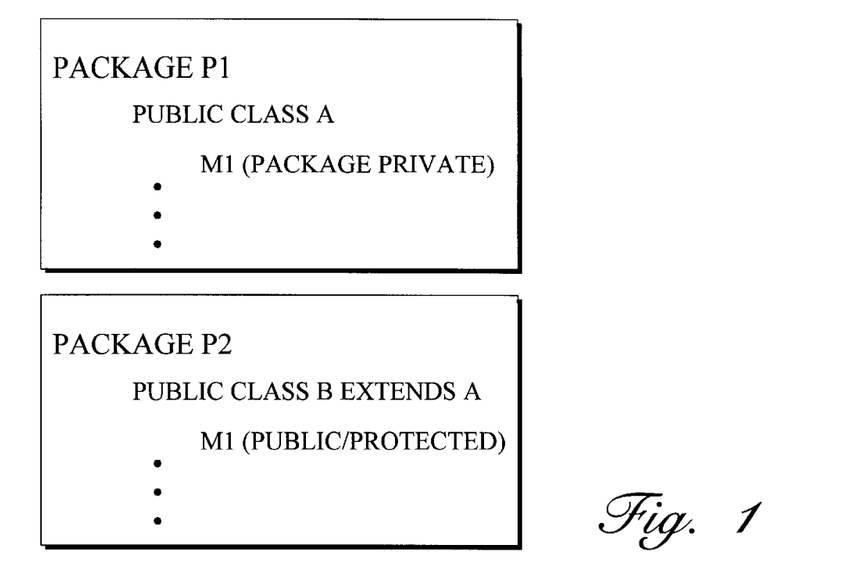
FIG. 1 is a diagram of two classes within two packages to illustrate the accessibility constraints that may be imposed by modularity constructs.

To elaborate, a modularity construct, sometimes referred to as a "package" in Java™, provides a mechanism for grouping or encapsulating selected classes. The package construct makes it possible to limit access to the classes within a package by classes in other packages. More specifically, each method of each class within a package may be declared as "public", "protected", or "package private". If a method is declared public or protected (denoted as public/protected hereinafter), then it may be accessed, and hence overridden, by any subclass of that class. On the other hand, if a method is declared package private, then that method may be accessed and overridden by a subclass if and only if that subclass is within the same package. Subclasses outside the package may not access or override the method. FIG. 1 illustrates an example of such a situation. In FIG. 1, there is shown two packages, P1 and P2. Package P1 contains a class A having a package private method M1. Package P2 contains a class B which extends A (meaning that B is a subclass of A) having a public/protected method M1. Because method M1 of class A is declared package private, and because class B is not in the same package as class A, class B will not be able to access or to override the method M1 of class A. Note that the package construct does not prevent class B from being a subclass of A, and hence, inheriting all of the attributes and methods of class A. The package only prevents class B from overriding the method M1 of class A. To enforce package constraints, it is a general rule that unless a subclass is within the same package as a higher level class that it wishes to override, it cannot override a package private method of the higher level class.

Figure 2:
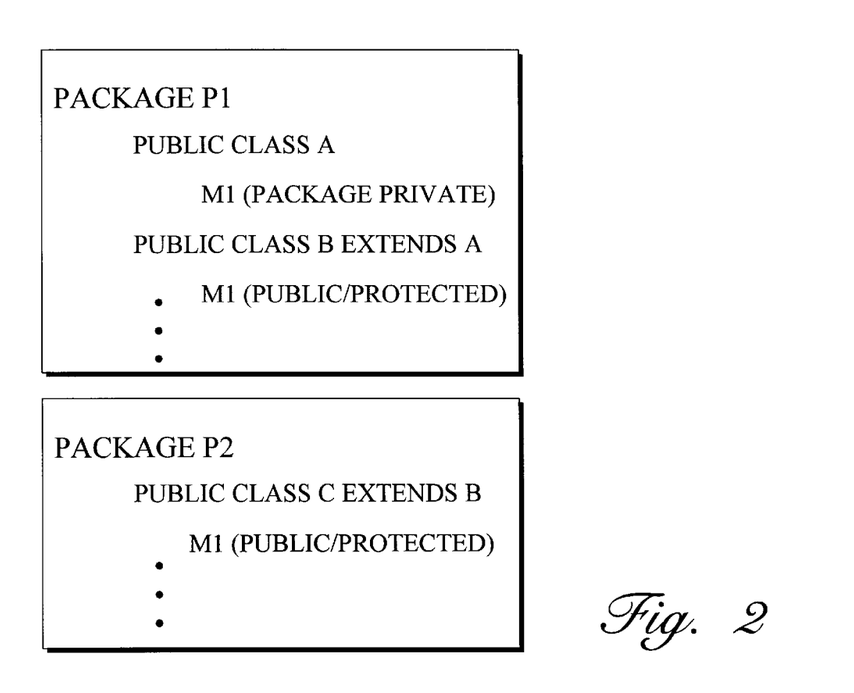
FIG. 2 is a diagram of three classes within two packages to illustrate how enforcement of modularity constraints may cause method override to be non-transitive.

While on the surface, this general rule appears to effectively enforce the accessibility constraints imposed by modularity constructs, it can lead to some undesirable results, one of which is that of non-transitive method override. To illustrate how this non-transitive result can arise, suppose that a structure such as that shown in FIG. 2 is created, wherein there are two packages, P1 and P2. In package P1, there is a class A having a package private method M1. In the same package, there is a subclass B which extends A, having a public/protected method M1. In package P2, there is a subclass C which extends B, and which has a public/protected method M1. With such a structure, it is clear that method M1 of subclass B can access and hence override method M1 of class A (since B is in the same package as A). It is also clear that method M1 of class C can override the method M1 of class B (since method M1 of B is declared to be public/protected). According to the transitive property, if method M1 of C can override method M1 of B, and method M1 of B can override method M1 of A, then method M1 of C should be able to override method M1 of A. This is not the result in this example, however, because under the rule set forth above, M1 of C cannot override M1 of A because M1 of A is package private and C is not in the same package as A. Thus, as this example shows, strict adherence to this rule can lead to non-transitive results. Because this is a somewhat non-intuitive result, and because transitive method override is a desirable property, there is a need for an improved dynamic method dispatch mechanism which is both capable of enforcing the accessibility constraints of modular constructs and providing transitive method override.

SUMMARY OF THE INVENTION

One mechanism that may be used to perform dynamic method dispatch is a method lookup mechanism. In the present invention, there is provided an improved method lookup mechanism which not only enforces accessibility constraints imposed by modularity constructs but also enables transitive method override.

According to one embodiment of the present invention, when a method m is invoked on a target object, the method m in a resolved class is checked to determine whether it has been declared as public/protected. If so, then standard method lookup may be used to determine the proper implementation of method m to invoke. However, if the resolved method is not declared as public/protected, then the class of the target object is searched for an implementation of the method m. If no implementation is found, then a superclass of the target object class is searched for an implementation. This process repeats until an implementation is found or until the resolved class is reached.

If an implementation for method m is found in a class (referred to as the current class) other than the resolved class, then a determination is made as to whether the current class can access the method m in the resolved class. The current class can access method m of the resolved class if the current class is in the same package P as the resolved class, or if an intervening class has "publicized" the method m of the resolved class. If either one of these conditions is met, then the implementation for method m in the current class is invoked. In effect, the method m of the current class is allowed to override the method m of the resolved class. By performing method lookup in accordance with the present invention, it is possible to both enforce accessibility constraints imposed by modularity constructs and enable transitive method override.

DETAILED DESCRIPTION OF THE EMBODIMENT(S)

Method lookup is one of the mechanisms that may be used to perform dynamic method dispatch. In the present invention, there is provided an improved method lookup mechanism which enables transitive method override while enforcing accessibility constraints imposed by modularity constructs. Before describing the method lookup mechanism of the present invention in detail, however, a brief discussion of method lookup in general will be provided in order to facilitate a complete understanding of the invention.

Basically, method lookup refers to the process, performed at runtime, of navigating through a class hierarchy to determine which method implementation to invoke in response to a method invocation. To fully discuss the topic of method lookup, several concepts need to be introduced. These concepts include the notion of a "resolved class", a "resolved method", and a "target object". These are best understood with reference to an example.

Suppose that the following statement appears in a set of source code written in a statically-typed language:

Foo (A a) {a.m( )}.

This statement declares that there is a function Foo which invokes a method m on an object of type (i.e. class) A. When the symbolic references of this statement are "resolved", which may take place at compile time or at link time (the Java™ programming system resolves at link time), a check is made to verify that there is indeed a method m defined in class A. If there is, then for purposes of function Foo, class A becomes the resolved class and method m of class A becomes the resolved method. Basically, the resolved class is the class in which there is guaranteed (unless an error has occurred) to be an implementation for the method m. As will be discussed below, this implementation for method m may not necessarily be the one that is invoked when Foo is executed, but it is one possible implementation. In effect, the resolved method may be viewed as the default implementation for method m. At this point, it should be noted that resolution of symbolic references typically takes place only once, at resolution time. It is not carried out each time the function Foo is executed.

As is clear from its declaration, Function Foo may be invoked on any object instance of class A. In addition, Foo may also be invoked on any object instance of any subclass of A. For example, if B is a subclass of A, and C is a subclass of B, then Foo may be invoked on an instance of class B, and an instance of class C. This makes sense since B and C, being subclasses of A, are technically of type A. The object instance on which Foo is invoked is referred to as the target object. Thus, if object T is an instance of class C, and function Foo is invoked on object T (denoted as Foo(T)), then object T is the target object.

When Foo is invoked on a target object, what is really taking place is that the method m of the class of the target object is being invoked. Because inheritance makes it possible for each subclass to override a method of a higher level class (i.e. to provide a different implementation for the method), the actual implementation of method m that is invoked may depend upon the class of the target object. To illustrate this point, suppose that there exists a class hierarchy such as that shown in FIG. 3, wherein there is a class B 304, having a superclass A 302 and a subclass C 306. Suppose further that for a function Foo, the resolved class is class A 302 and the resolved method is method m of class A 302. In addition, suppose that each class provides a different implementation for method in, with class A 302 providing implementation m(1), class B 304 providing implementation m(2), and class C 306 providing implementation m(3). Assuming that all of the subclasses can access and override all of the methods of the higher level classes, the implementation of method m that is invoked when function Foo is invoked on a target object will depend upon the class of the target object.

Figure 3:
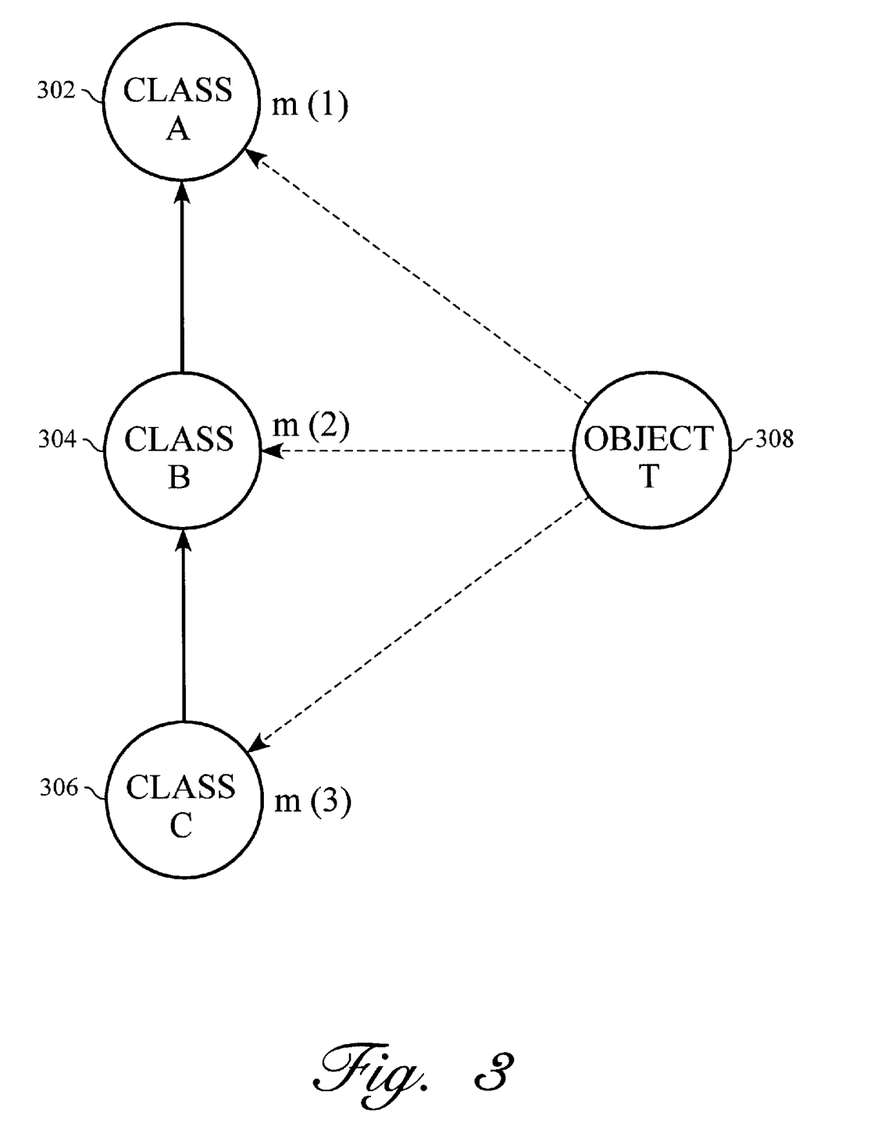
FIG. 3 is a diagram of a sample class hierarchy to illustrate the manner in which the standard method lookup methodology carries out dynamic method dispatch.

For example, if target object T 308 is an instance of class C 306, then implementation m(3) of method in will be invoked when Foo is executed. On the other hand, if the target object T 308 is an instance of class B 304, then implementation m(2) of method m will be invoked. As this discussion shows, even though class A is the resolved class and method m of class A 302 is the resolved method, the implementation for method in that is actually invoked at runtime may not (and often is not) the implementation m(1) provided by the resolved class.

One methodology that has been used to perform dynamic method dispatch is that of standard method lookup. This methodology will be described with reference to the sample hierarchy shown in FIG. 3. According to standard method lookup, when a method m is invoked on a target object of a certain class (class C 306, for example), that class 306 is checked for an implementation of the method m. If an implementation is found, as is the case in this example, then that method implementation m(3) is invoked. Otherwise, the superclass 304 of the current class 306 is checked for an implementation of the method m. If an implementation is found in the superclass, then that method implementation m(2) is invoked. Otherwise, the next superclass 302 is checked. This process continues until an implementation is found and invoked or the resolved class 302 is reached. If the resolved class 302 is reached, then the resolved method implementation m(1) will be invoked.

The standard method lookup methodology is based upon the assumption that each subclass can access and override each method of its superclass. Because it is based upon this assumption, it cannot handle the accessibility limits imposed by modularity constructs, and because it cannot handle modularity constructs, it cannot enable transitive method override in the face of such constructs. The present invention provides a method lookup mechanism which addresses and solves all of these problems.

Figure 4:
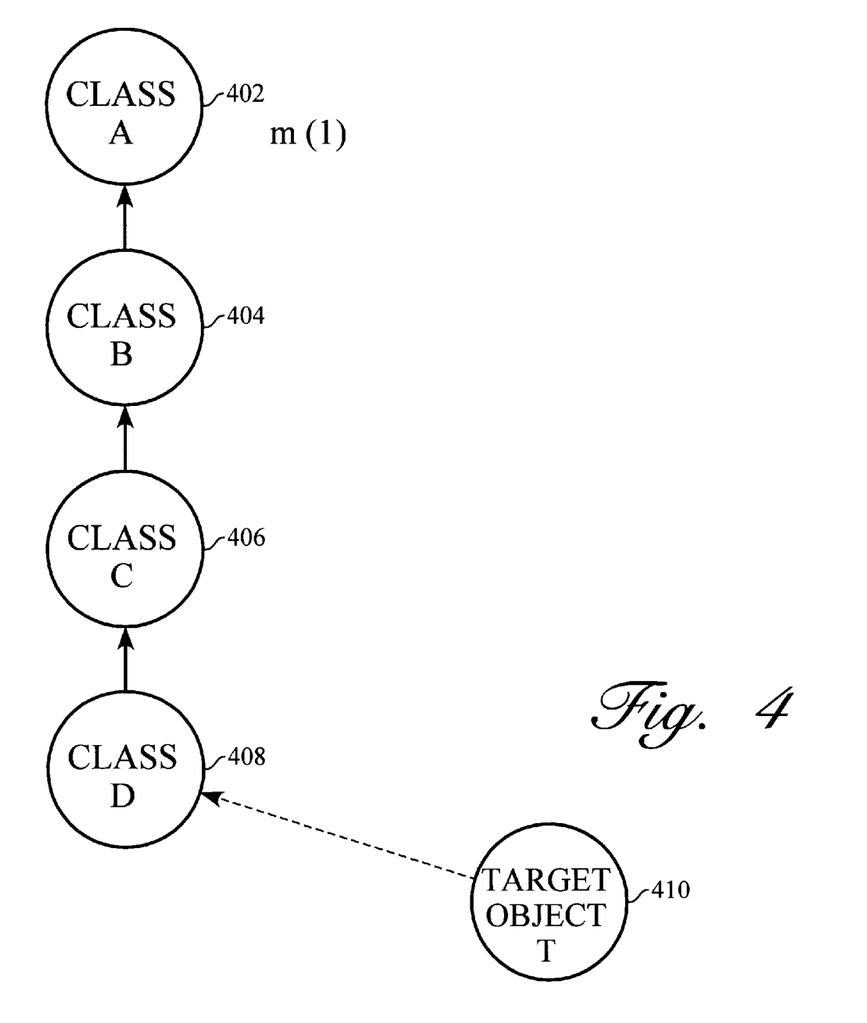
FIG. 4 is a diagram of a sample class hierarchy for use in facilitating description of the present invention.
Figure 5A:
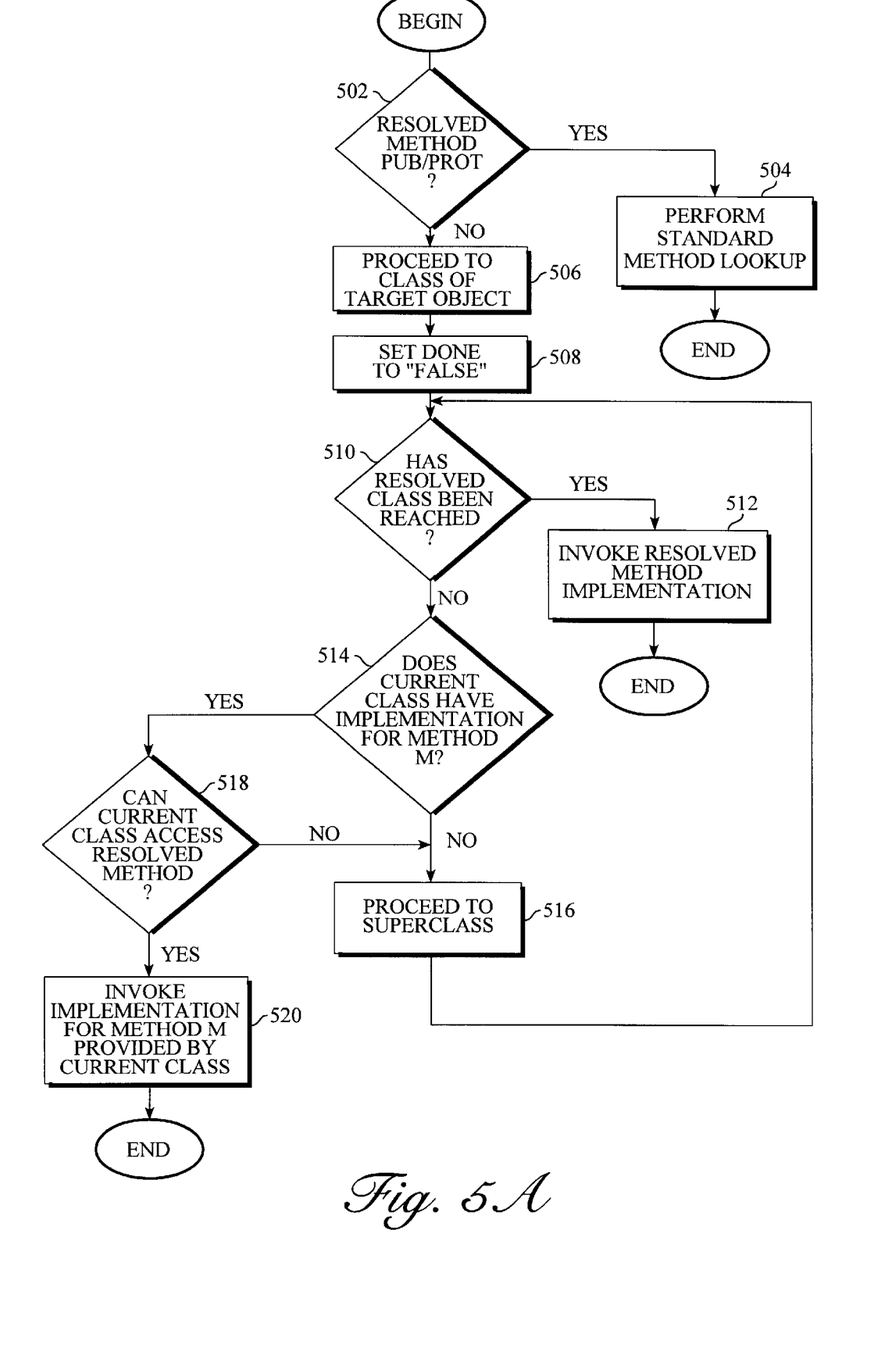
FIGS. 5a–5c are flow diagrams for the method of the present invention.
Figure 5B:
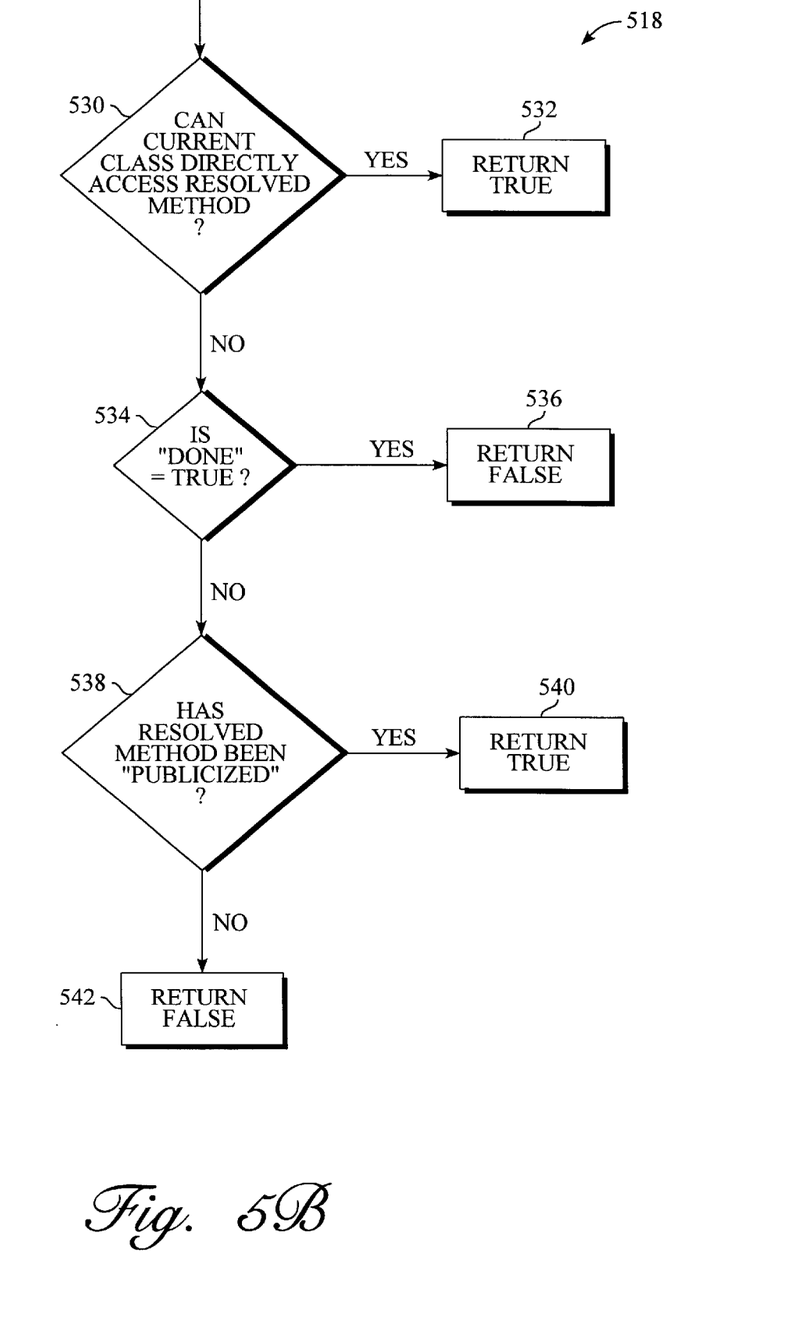
Figure 5C:
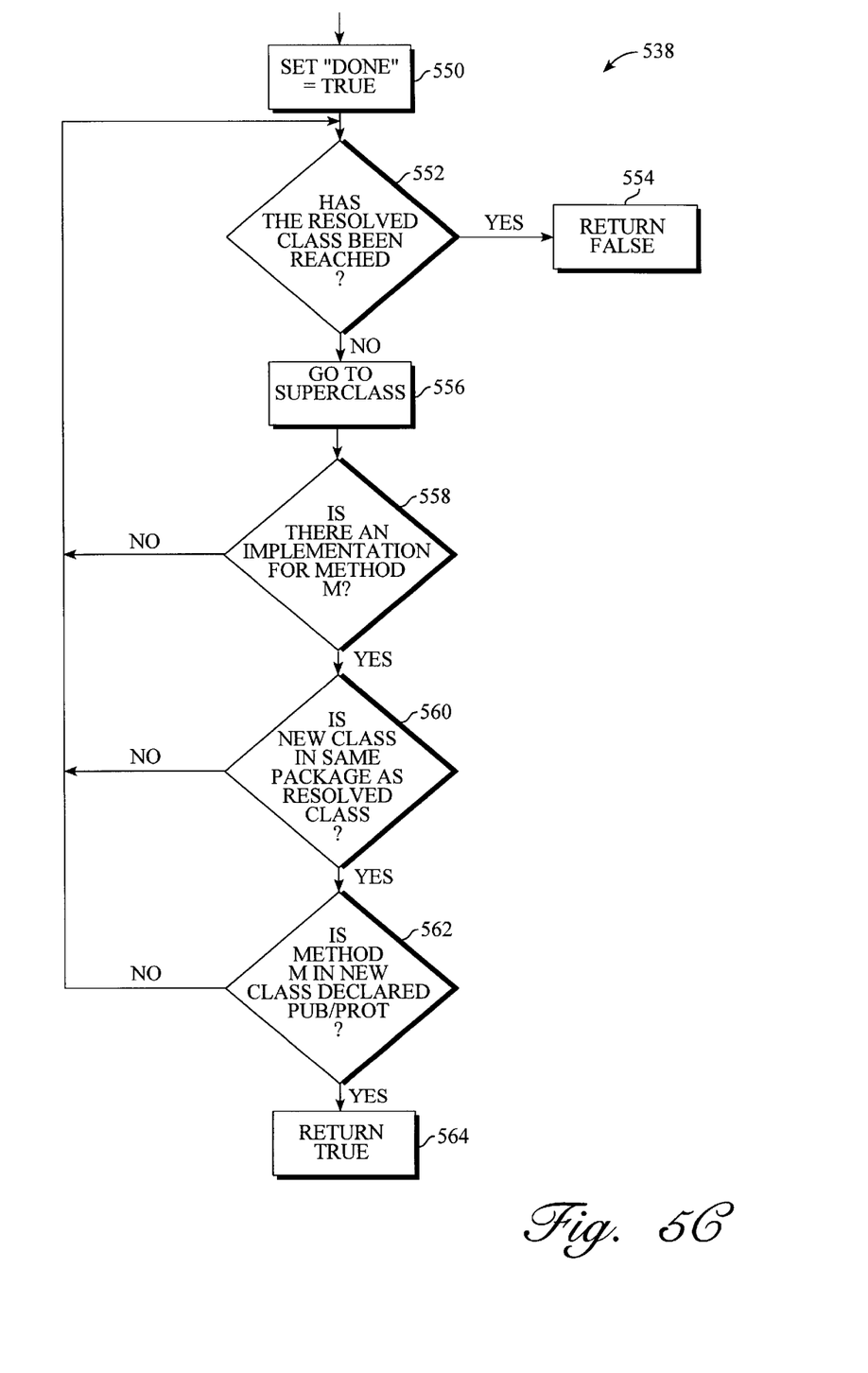

With reference to FIGS. 4 and 5*a*–5*c*, the present invention will now be described in detail. FIG. 4 shows a sample class hierarchy which will be used to facilitate the description of the invention. FIGS. 5*a*–5*c* are the flow diagrams for the methodology of the present invention. The following description will be based upon the following assumptions: (1) the resolved class is class A 402 which is part of a package P; (2) the resolved method is method m of class A 402 having a resolved method implementation m(1); (3) the target object is object T 410; and (4) the method invocation is on method m of target object T 410.

As shown in FIG. 5*a*, the lookup method of the present invention begins by determining (502) whether the resolved method (method m of class A 402) has been declared as public/protected. If it has, then it can be accessed and overridden by all subsequent subclasses. If that is the case, then the standard method lookup procedure discussed above may be used to perform (504) the method dispatch. Namely, the class 408 of the target object T 410 is searched for an implementation of the method m. If an implementation is found, then it is invoked. Otherwise, the next superclass 406 is searched for an implementation of method m. If an implementation if found in the superclass 406, then that implementation is invoked. Otherwise, the next superclass 404 is searched. This process continues until either an implementation for method m is found and invoked in one of the subclasses 404, 406, 408, or the resolved class 402 is reached, in which case the resolved method implementation m(1) is invoked.

Returning to (502), if the resolved method is not declared public/protected, then it is private to package P. This is known because if the resolved method were private to another package or private altogether, then it would have failed to link, in which case, it would not have even gotten to the point of execution. If the resolved method is private to package P, then a more involved process will be used to determine which implementation of method m to invoke. Specifically, the process proceeds (506) to the class 408 of the target object T 410, notes it as the current class, and sets (508) the Done variable to "False". The significance of the Done variable will be made clear in a later section. Thereafter, a determination (510) is made as to whether the resolved class 402 has been reached. If it has, then the implementation m(1) provided by the resolved method is invoked (512), and the dynamic method dispatch process is terminated. On the other hand, if the resolved class 402 has not been reached, then the current class 408 is checked (514) to determine whether it has an implementation for method m. If it does not, then the process proceeds (516) to the next superclass 406, notes it as the new current class, and loops back to (510) to determine whether the resolved class has been reached. This loop continues until either an implementation for method m is found in a subclass 404, 406, 408 of the resolved class 402, or the resolved class 402 is reached.

Returning to (514), if an implementation for method m is found in the current class (for the sake of illustration, it will be assumed the current class is class D 408), then a determination (518) is made as to whether the current class 408 can access and hence override the resolved method. If so, then the implementation for method m provided by the current class is invoked (520), and the dynamic method dispatch process is terminated. However, if the current class cannot access and override the resolved method, then the implementation for method m provided by the current class 408 cannot be invoked. In such a case, the process proceeds to (516) to go to the superclass 406 of the current class 408 to look for another implementation for method m.

In determining (518) whether the current class 408 can access and override the resolved method, up to two determinations need to be made. The first determination is whether the current class 408 can access the resolved method directly. If so, then the current class can directly access and override the resolved method. Even if the current class 408 cannot directly access the resolved method, it may still be able to override the resolved method if one of the intervening classes 404, 406 has "publicized" it. It is this notion that a package private method may be publicized by a subsequent subclass that gives rise to the transitive property of the present invention.

FIG. 5*b* shows in greater detail the process (518) of determining whether the current class 408 can access the resolved method. As discussed, the first determination (530) that is made is whether the current class 408 can directly access the resolved method. Put another way, is the current class 408 in the same package P as the resolved class 402? If so, then the current class 408 can access and override the resolved method. In such a case, the process returns True (532) and the implementation for method m provided by the current class 408 is invoked (520 of FIG. 5*a*).

If the current class 408 cannot directly access the resolved method, then a determination is made as to whether the resolved method has been publicized by an intervening subclass 404, 406. Before this determination is made, however, the Done variable is checked (534) to see whether it has been set to True. In this implementation, the process of determining whether the resolved method has been publicized needs to be performed only once. The Done variable is used to indicate whether this process has already been performed. If Done is set to True, thereby meaning that the "publicize" check has already been performed, then the process returns False. This in turn causes the implementation for method m provided by the current class 408 to not be invoked, and the process to proceed (516 of FIG. 5*a*) to the next superclass 406.

However, if the Done variable has not been set to True, then a determination (538) is made as to whether the resolved method has been publicized. The process of making this determination (538) is shown in greater detail in FIG. 5*c*. Process (538) begins with setting (550) the Done variable to True to indicate that the "publicize" check is being performed. Thereafter, a determination (552) is made as to whether the resolved class 402 has been reached. If it has, then it means that no intervening subclass publicized the resolved method. In such a case, the process returns False (554) to indicate that the resolved method has not been publicized.

However, if the resolved class 402 has not be reached, then the process proceeds (556) to the superclass 406 of the current class 408. This superclass 406 is noted as the new class. The new class 406 is then checked (558) for an implementation for method m. If no implementation is found, then the process loops back to (552). However, if an implementation for method m is found, then a determination (560) is made as to whether the new class 406 is in the same package P as the resolved method. If not, then the process loops back to (552). If so, then a determination (562) is made as to whether the method m in the new class 406 is marked public/protected. If it is, then the resolved method has been publicized by the new class 406, meaning that all subclasses of the new class 406 can access and override the resolved method. In such a case, the process returns True (564). Otherwise, the process loops back to (552) to test the next superclass. This process (552 to 564) continues until it is determined that the resolved method has been publicized or the resolved class 402 has been reached.

Returning to (538) of FIG. 5*b*, if it is determined that the resolved method has been publicized, then the process returns True (540), causing the implementation for method m provided by the current class 408 to be invoked (520 of FIG. 5*a*). Otherwise, the process returns False (542), which causes the process to proceed (516) to the next superclass to search for the next implementation for method m. Performed in the manner described, dynamic method dispatch using method lookup will be able to enforce accessibility constraints imposed by modularity constructs while enabling transitive method override.

To illustrate that the present invention does indeed enable transitive method override, reference will be made to the example shown in FIG. 2. As discussed previously, under the transitive property, since method M1 of C can override method M1 of B, and method M1 of B can override method M1 of A, method M1 of C should be able to override method M1 of A. This is indeed the result achieved with the present invention.

According to the invention, assuming that the resolved class is class A and the resolved method is method M1 of class A, when the method M1 is invoked on an object instance of class C, a search is performed on class C for an implementation of method M1. Once this implementation is found, a determination is made as to whether class C can access and override M1 of class A. This determination is made by first determining whether class C can directly access method M1 of class A. Since, class C is in package P2 and class A is in package P1, class C cannot directly access method M1 of class A. This being the case, a second determination is made to determine whether any intervening subclass has publicized method M1 of class A. In this example, method M1 of class A has been publicized by method M1 of class B. This is so because: (1) class B contains an implementation for M1; (2) class B is in the same package P1 as class A, and hence can directly access method M1 of class A; and (3) class B has declared M1 as public/protected. Because M1 has been declared by class B as public/protected, subclass C can now access and override method M1 of class A. As a result, the implementation provided by class C for method M1 can be invoked. This is exactly the desired result.

Hardware Overview

Figure 6:
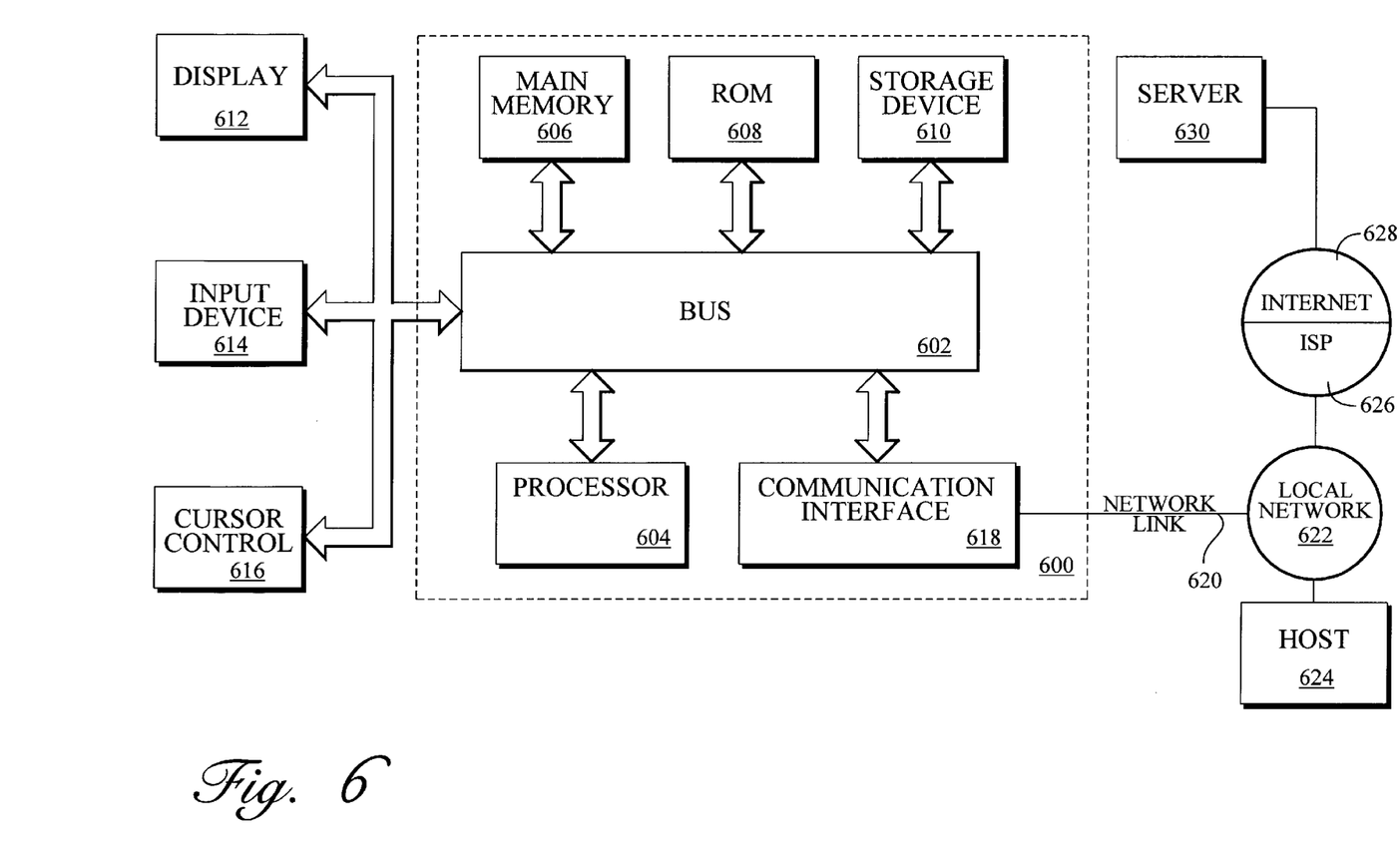
FIG. 6 is a hardware block diagram of a computer system in which an embodiment of the present invention may be implemented.

In one embodiment, the present invention is implemented as a set of instructions executable by one or more processors. The invention may be implemented as part of any object oriented programming system, including but not limited to the Java™ programming system manufactured by Sun Microsystems, Inc. of Mountain View, Calif. FIG. 6 shows a hardware block diagram of a computer system 600 in which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. In addition to being used to store class and object instance information, main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 10 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for performing dynamic method dispatch, comprising:

detecting an invocation of a method m on a target object, said invocation having associated therewith a resolved method and a resolved class, wherein said resolved method is private to a particular modularity construct;

finding a potential implementation for said method m, said potential implementation being associated with a class X;

determining whether an intervening class has publicized said resolved method; and in response to a determination that an intervening class has publicized said resolved method, invoking said potential implementation, thereby overriding said resolved method.

2. The method of claim 1, further comprising:

determining whether said potential implementation can directly override said resolved method; and in response to a determination that said potential implementation can directly override said resolved method, invoking said potential implementation, thereby overriding said resolved method.

3. The method of claim 2, wherein determining whether said potential implementation can directly override said resolved method comprises:

determining whether said class X is within said same particular modularity construct as said resolved class.

4. The method of claim 1, wherein said target object is an instance of a target object class, and wherein finding a potential implementation for said method m comprises:

determining whether said target object class has associated therewith an implementation for said method m; and in response to a determination that said target object class has associated therewith an implementation for said method m, selecting said implementation as said potential implementation.

5. The method of claim 4, further comprising:

in response to a determination that said target object class does not have associated therewith an implementation for said method m, proceeding to a superclass of said target object class;

determining whether said superclass has associated therewith an implementation for said method m; and in response to a determination that said superclass has associated therewith an implementation for said method m, selecting said implementation as said potential implementation.

6. The method of claim 1, wherein said class X is a subclass of said resolved class, wherein said intervening class is a subclass of said resolved class, and wherein said intervening class is situated between said resolved class and said class X in a class hierarchy.

7. The method of claim 1, wherein determining whether an intervening class has publicized said resolved method comprises:

finding an implementation for said method m in a superclass of said class X;

determining whether said implementation can directly override said resolved method; and in response to a determination that said implementation can directly override said resolved method, determining whether said method m in said superclass has been declared as not being private to any modularity construct.

8. The method of claim 7, wherein determining whether said implementation can directly override said resolved method comprises:

determining whether said superclass is within said same particular modularity construct as said resolved class.

9. The method of claim 7, further comprising:

in response to a determination that said method m in said superclass has been declared as not being private to any modularity construct, providing an indication that said resolved method has been publicized.

10. The method of claim 7, wherein said method m in said superclass is considered to have been declared as not being private to any modularity construct if it is designated as being either public or protected.

11. An apparatus for performing dynamic method dispatch, comprising:

a mechanism for detecting an invocation of a method m on a target object, said invocation having associated therewith a resolved method and a resolved class, wherein said resolved method is private to a particular modularity construct;

a mechanism for finding a potential implementation for said method m, said potential implementation being associated with a class X;

a mechanism for determining whether an intervening class has publicized said resolved method; and a mechanism for invoking, in response to a determination that an intervening class has publicized said resolved method, said potential implementation, thereby overriding said resolved method.

12. The apparatus of claim 11, further comprising:

a mechanism for determining whether said potential implementation can directly override said resolved method; and a mechanism for invoking, in response to a determination that said potential implementation can directly override said resolved method, said potential implementation, thereby overriding said resolved method.

13. The apparatus of claim 12, wherein said mechanism for determining whether said potential implementation can directly override said resolved method comprises:

a mechanism for determining whether said class X is within said same particular modularity construct as said resolved class.

14. The apparatus of claim 11, wherein said target object is an instance of a target object class, and wherein said mechanism for finding a potential implementation for said method m comprises:

a mechanism for determining whether said target object class has associated therewith an implementation for said method m; and a mechanism for selecting, in response to a determination that said target object class has associated therewith an implementation for said method m, said implementation as said potential implementation.

15. The apparatus of claim 14, further comprising:

a mechanism for proceeding, in response to a determination that said target object class does not have associated therewith an implementation for said method m, to a superclass of said target object class;

a mechanism for determining whether said superclass has associated therewith an implementation for said method m; and a mechanism for selecting, in response to a determination that said superclass has associated therewith an implementation for said method m, said implementation as said potential implementation.

16. The apparatus of claim 11, wherein said class X is a subclass of said resolved class, wherein said intervening class is a subclass of said resolved class, and wherein said intervening class is situated between said resolved class and said class X in a class hierarchy.

17. The apparatus of claim 11, wherein said mechanism for determining whether an intervening class has publicized said resolved method comprises:

a mechanism for finding an implementation for said method m in a superclass of said class X;

a mechanism for determining whether said implementation can directly override said resolved method; and a mechanism for determining, in response to a determination that said implementation can directly override said resolved method, whether said method m in said superclass has been declared as not being private to any modularity construct.

18. The apparatus of claim 17, wherein said mechanism for determining whether said implementation can directly override said resolved method comprises:

a mechanism for determining whether said superclass is within said same particular modularity construct as said resolved class.

19. The apparatus of claim 17, wherein said method m in said superclass is considered to have been declared as not being private to any modularity construct if it is designated as being either public or protected.

20. The apparatus of claim 17, further comprising:

a mechanism for providing, in response to a determination that said method m in said superclass has been declared as not being private to any modularity construct, an indication that said resolved method has been publicized.

21. A computer readable medium having stored thereon instructions which, when executed by one or more processors, cause the one or more processors to perform dynamic method dispatch, said computer readable medium comprising:

instructions for causing one or more processors to detect an invocation of a method m on a target object, said invocation having associated therewith a resolved method and a resolved class, wherein said resolved method is private to a particular modularity construct;

instructions for causing one or more processors to find a potential implementation for said method m, said potential implementation being associated with a class X;

instructions for causing one or more processors to determine whether an intervening class has publicized said resolved method; and instructions for causing one or more processors to invoke, in response to a determination that an intervening class has publicized said resolved method, said potential implementation, thereby overriding said resolved method.

22. The computer readable medium of claim 21, further comprising:

instructions for causing one or more processors to determine whether said potential implementation can directly override said resolved method; and instructions for causing one or more processors to invoke, in response to a determination that said potential implementation can directly override said resolved method, said potential implementation, thereby overriding said resolved method.

23. The computer readable medium of claim 22, wherein said instructions for causing one or more processors to determine whether said potential implementation can directly override said resolved method comprises:

instructions for causing one or more processors to determine whether said class X is within said same particular modularity construct as said resolved class.

24. The computer readable medium of claim 21, wherein said target object is an instance of a target object class, and wherein said instructions for causing one or more processors to find a potential implementation for said method m comprises:

instructions for causing one or more processors to determine whether said target object class has associated therewith an implementation for said method m; and instructions for causing one or more processors to select, in response to a determination that said target object class has associated therewith an implementation for said method m, said implementation as said potential implementation.

25. The computer readable medium of claim 24, further comprising:

instructions for causing one or more processors to proceed, in response to a determination that said target object class does not have associated therewith an implementation for said method m, to a superclass of said target object class;

instructions for causing one or more processors to determine whether said superclass has associated therewith an implementation for said method m; and instructions for causing one or more processors to select, in response to a determination that said superclass has associated therewith an implementation for said method m, said implementation as said potential implementation.

26. The computer readable medium of claim 21, wherein said class X is a subclass of said resolved class, wherein said intervening class is a subclass of said resolved class, and wherein said intervening class is situated between said resolved class and said class X in a class hierarchy.

27. The computer readable medium of claim 21, wherein said instructions for causing one or more processors to determine whether an intervening class has publicized said resolved method comprises:

instructions for causing one or more processors to find an implementation for said method m in a superclass of said class X;

instructions for causing one or more processors to determine whether said implementation can directly override said resolved method; and instructions for causing one or more processors to determine, in response to a determination that said implementation can directly override said resolved method, whether said method m in said superclass has been declared as not being private to any modularity construct.

28. The computer readable medium of claim 27, wherein said method m in said superclass is considered to have been declared as not being private to any modularity construct if it is designated as being either public or protected.

29. The computer readable medium of claim 27, further comprising:

instructions for causing one or more processors to provide, in response to a determination that said method m in said superclass has been declared as not being private to any modularity construct, an indication that said resolved method has been publicized.

30. The computer readable medium of claim 27, wherein said instructions for causing one or more processors to determine whether said implementation can directly override said resolved method comprises:

instructions for causing one or more processors to determine whether said superclass is within said same particular modularity construct as said resolved class.

* * * * *